United States Patent [19]
McPhee et al.

[11] Patent Number: 5,618,125
[45] Date of Patent: Apr. 8, 1997

[54] DOWELL ALIGNMENT APPARATUS

[75] Inventors: Mike McPhee; Russell Boxall, both of Charlotte, N.C.

[73] Assignee: Permaban North America, Inc., Matthews, N.C.

[21] Appl. No.: 542,545

[22] Filed: Oct. 13, 1995

Related U.S. Application Data

[63] Continuation of Ser. No. 183,193, Jan. 18, 1994, abandoned.

[51] Int. Cl.$^6$ .................................................. E04B 1/682
[52] U.S. Cl. .......................... 403/12; 403/2; 404/47; 404/51; 404/61; 52/396.02
[58] Field of Search ............................ 404/47–51, 60–62; 264/34, 35, 260, 261; 52/318, 393, 396.02, 396.04, 396.05, 396.07, 220.8; 285/3, 4; 403/12, 2, 13

[56] References Cited

U.S. PATENT DOCUMENTS

| | | |
|---|---|---|
| 1,754,107 | 4/1930 | Jannarone . |
| 2,080,124 | 5/1937 | Friberg .................................. 404/47 X |
| 2,323,026 | 6/1943 | Geyer . |
| 2,365,550 | 12/1944 | Heltzel ................................. 404/62 X |
| 2,482,836 | 9/1949 | Brickman et al. ..................... 404/47 X |
| 2,636,426 | 4/1953 | Heltzel . |
| 2,772,468 | 12/1956 | Heltzel . |
| 2,962,789 | 12/1960 | Williams . |
| 3,242,831 | 3/1966 | Crone ........................................ 404/61 |
| 3,503,584 | 3/1970 | Erhart et al. . |
| 3,618,887 | 11/1971 | Eriksson . |
| 3,985,482 | 10/1976 | Suzuki . |
| 4,053,134 | 10/1977 | Peacock . |
| 4,192,481 | 3/1980 | Durbin . |
| 4,522,531 | 6/1985 | Thomsen et al. ..................... 404/62 X |
| 4,666,326 | 5/1987 | Hope ......................................... 403/13 |
| 4,732,397 | 3/1988 | Gavin ..................................... 285/4 X |
| 4,884,384 | 12/1989 | Ljungkvist et al. . |
| 5,005,331 | 4/1991 | Shaw et al. . |
| 5,216,862 | 6/1993 | Shaw et al. ......................... 52/396.02 |
| 5,230,842 | 7/1993 | Munde ..................................... 264/34 |

FOREIGN PATENT DOCUMENTS

| | | | |
|---|---|---|---|
| 59171 | 9/1982 | European Pat. Off. ................. 404/60 |

*Primary Examiner*—Anthony Knight
*Attorney, Agent, or Firm*—Banner & Witcoff, Ltd.

[57] ABSTRACT

An apparatus for positioning a dowel within a concrete slab is disclose. The apparatus comprises a substantially planar mounting flange that is used to mount the apparatus onto a wooden form, and a dowel guide that extends perpendicularly from the plane of the mounting flange.

Together, the mounting flange and the dowel guide define a dowel passage that is aligned with a corresponding hole in the wooden form. The dowel passage allows a dowel to be slipped through the apparatus and through the hole in the form, and to extend into the region where the slab is to be poured. The invention allows dowels to be properly and consistently aligned before and during the pouring of a concrete slab.

7 Claims, 3 Drawing Sheets

DOWELL ALIGNMENT APPARATUS

This application is a continuation of application Ser. No. 08/183,193 filed Jan. 18, 1994, abandoned.

BACKGROUND OF THE INVENTION

The claimed invention relates generally to the field of pouring multiple section concrete slabs. More particularly, the invention relates to an apparatus for accurately positioning dowels within a slab to distribute and equalize loads at the junctions between adjacent sections of the slab.

In the construction of concrete slabs, it has long been the practice to use forms to define the area into which the concrete slab is to be poured. The forms serve to contain the wet concrete mixture when it is poured and while it hardens. When a large slab is to be poured, wooden forms are commonly used to divide the slab into smaller subsections, each of which is poured separately. However, one problem that can arise when slabs are poured in separate subsections is that the junctions or joints between adjacent sections are subject to damage from downward forces exerted against the slab.

To reduce the effects of such forces, it is common practice to embed dowels into the slab. The dowels bridge across the joint between adjacent subsections of the slab and extend a short distance into each subsection. The dowels, which are typically two to four feet in length, are placed at regular intervals along the joint, and act to equalize and transfer loads that are exerted against the joint. Before the first section of the slab is poured, holes are drilled through the wooden forms at regular intervals. A dowel is then extended into each hole, so that approximately half of the dowel's length extends into the region where the slab is to be poured. The slab section is then poured into place, with the wet concrete surrounding the portion of each dowel that extends into the region where the concrete was poured. When the concrete has dried, the form is removed by slipping it off of the dowels, which remain embedded in the concrete. The adjacent slab section is then poured into place against the first section, over the remaining exposed portions of the dowels.

However, if the dowels are not installed correctly, problems can arise. Specifically, if the dowels are not parallel to the slab surface and perpendicular to the joint between the slab sections, unwanted stresses can be created in the slab, which can lead to cracking of the slab. Proper alignment of the dowels is made difficult by the fact that the hole in the form through which the dowel is inserted must have a substantially greater diameter than that of the dowel, to allow the form to be stripped off of the dowel once the first slab section has dried.

Heretofore, procedures for aligning the dowels have failed to provide consistent, proper placement of the dowels. In the field, workers typically nail shims or boards onto the outer surface of the form to support the dowels in place. However, the alignment is typically not precise, or consistent from dowel to dowel. Moreover, the positioning of the dowels can be easily disrupted by the wet concrete as it moves into place around the dowels.

A need therefore exists for a way to provide consistent, proper alignment of dowels. The alignment of the dowels should, however, be simple and straightforward, and should not interfere with the ability to strip the forms off of the dowels once the first section of the slab has dried.

It is therefore an object of the invention to provide an apparatus that will allow dowels to be properly and consistently aligned before and during the pouring of a concrete slab.

It is a further object of the invention to provide an apparatus that can be easily used by unskilled laborers, with a minimum of training.

It is a further object of the invention to provide an apparatus for aligning dowels that is low in cost, and does not require any special tools.

SUMMARY OF THE INVENTION

In a basic aspect, the claimed invention is an apparatus for positioning a dowel within a concrete slab. The apparatus comprises a substantially planar mounting flange that is used to mount the apparatus onto a wooden form, and a dowel guide that extends from the mounting flange at a desired angle, usually perpendicular to the primary planes of both the mounting flange and the wooden form.

Together, the mounting flange and the dowel guide define a dowel passage that is aligned with a corresponding hole in the wooden form. The dowel passage allows a dowel to be slipped through the apparatus and through the hole in the form, and to extend into the region where the slab is to be poured. After the slab section has been poured and the concrete has sufficiently set, the dowel positioning apparatus is disconnected from the form and slipped off of the dowel. The form is then slipped off of the dowel and away from the slab, leaving the dowel embedded in place.

DETAILED DESCRIPTION OF THE PREFERRED EMBODIMENTS

Figure 1:
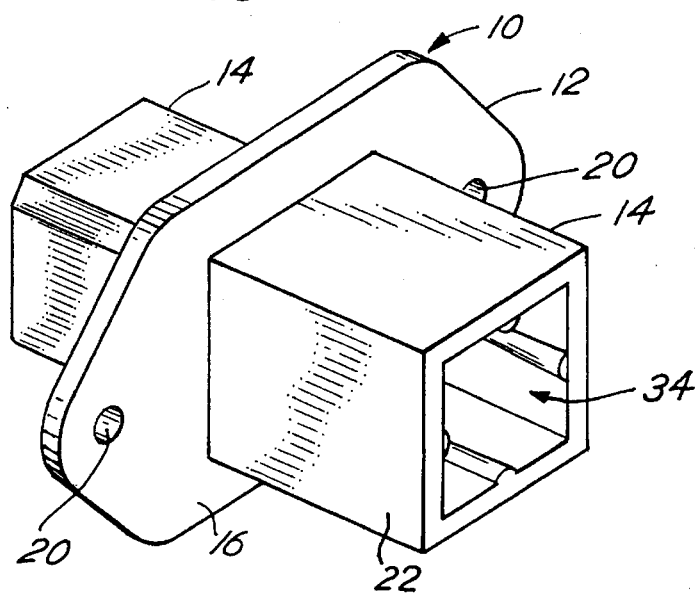
FIG. 1 of the drawing is a perspective view of a preferred embodiment of the claimed invention.
Figure 2:
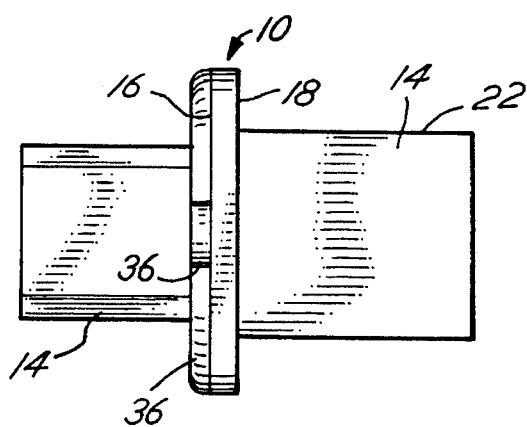
FIG. 2 of the drawing is a side view of a preferred embodiment of the claimed invention.
Figure 3:
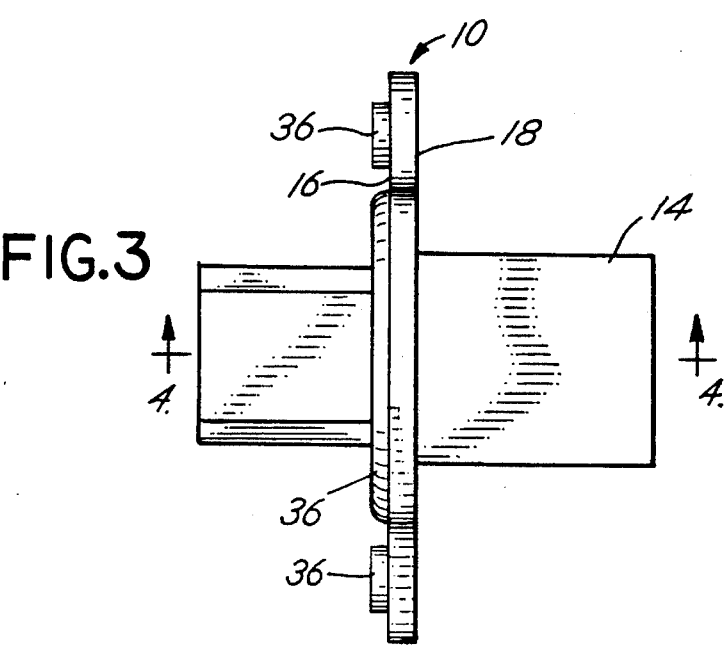
FIG. 3 of the drawing is a top view of the embodiment shown in FIG. 2.
Figure 5:
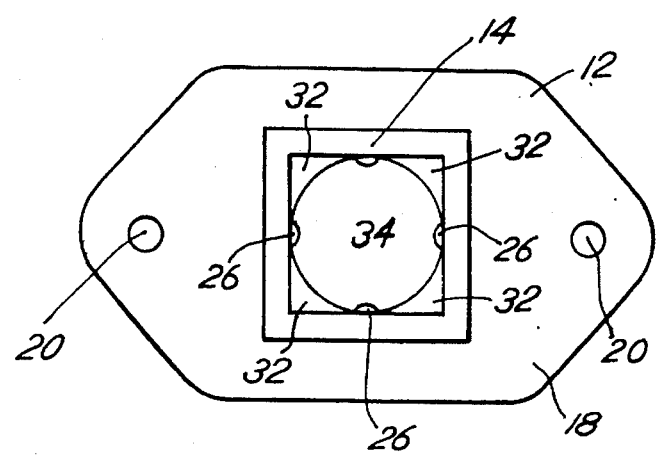
FIG. 5 of the drawing is an end view of the embodiment shown in FIGS. 2 and 3, taken from the outward facing end of the apparatus.
Figure 6:
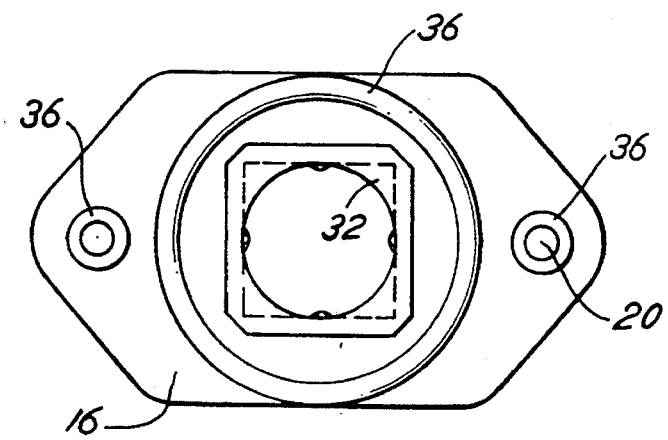
FIG. 6 of the drawing is an end view of the embodiment shown in FIG. 5, taken from the opposite, inward facing, end of the apparatus.

Referring first to FIGS. 1, 2, and 3, the claimed invention is a dowel positioning apparatus 10. The apparatus 10 generally comprises a mounting flange 12 and a dowel guide 14. The mounting flange 12 is substantially flat and planar, which allows it to be mounted against a wooden form. The mounting flange has an inner surface 16 which faces against the wooden form when the apparatus is in place, and an outer surface 18, which faces away from the wooden form. The mounting flange can have any suitable perimeter shape, as will be easily selected by persons of skill in the art, keeping in mind that the flange should be capable of holding the apparatus steadily in place against the form. A particular preferred shape is shown in FIGS. 5 and 6.

Figure 4:
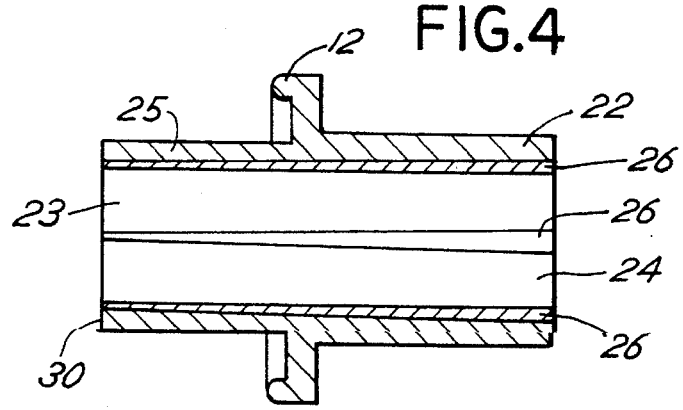
FIG. 4 of the drawing is a cross sectional view of the embodiment shown in FIGS. 2 and 3, taken along the line 3—3 shown in FIG. 3.

The mounting flange has two or more holes 20 through which nails or tacks can be introduced for attaching the apparatus against the wooden slab form. Alignment marks may be located on the outer surface 18 of the mounting flange 12. When positioning the mounting flange against a wooden form, those marks may be aligned with corresponding lines marked onto the wooden form. The dowel guide 14 extends from the mounting flange 12 at a desired angle, preferably perpendicular to the plane of the mounting flange. The dowel guide, which comprises a straight tube 22, has an inner surface 23 and an outer surface 25, shown in FIG. 4. The inner surface of the dowel guide defines a straight dowel passage 24, shown in FIG. 4. The dowel passage 24 extends through the mounting flange 12, so that a dowel can pass through the entire apparatus, with opposite ends of the dowel extending from the opposite ends of the apparatus. The dowel guide can extend from the outer surface 18 of the mounting flange, or from the inner surface 16 of the mounting flange, or from both of those surfaces, as shown in the figures.

The dowel passage can have any of a number of cross section shapes. In a preferred embodiment, the dowel passage 24 has a square cross-section. This permits the use of either square or round dowels in conjunction with the apparatus. As will be understood by persons of skill in the art, the inner dimensions of the dowel passage should correspond as closely as possible to the outer dimensions of the dowel, while allowing the dowel to be relatively freely slidable into and out of the dowel passage.

The dowel guide should be dimensioned so that a dowel that is positioned in the dowel passage will be relatively free of lateral movement. The inner surfaces of the dowel guide, which define the dowel passage, should therefore conform closely at various points to the outer dimensions of the dowel. The length of the dowel guide should be sufficient to provide the required lateral support for the dowel, while at the same time allowing the dowel to slide along the longitudinal axis of the dowel passage. The preferred length of the dowel guide is from 2 to 3 inches for use with a typical dowel.

To provide for fluctuations in dowel diameter, and to insure stable positioning of a dowel within the apparatus, tapered ridges 26 extend the length of the dowel passage, on each of the inner walls of the dowel guide. The height of the ridges is greatest at the outward end 28 of the dowel passage 24, and diminishes as the ridge extends inward to the opposite, inward end 30 of the dowel passage. In practice, a dowel that is introduced into the dowel passage can be forcefully driven into the dowel passage, thereby deforming the ridges towards the inner walls of the dowel guide, or shaving the ridges off at the points where they contact the dowel. This will assure a secure fit for the dowel within the dowel passage.

In situations where a round dowel is used with an apparatus having a square cross-sectioned dowel passage, a problem arises in that wet concrete can seep into the dowel passage at the points where the dowel and the inner surface of the dowel guide are not in actual contact. To alleviate this problem, the end 30 of the dowel guide can have a thin rupturable membrane 32 that extends into or across the dowel passage from the inner surface of the dowel guide, with the plane of the membrane being perpendicular to the longitudinal axis of the dowel passage. As shown in FIG. 6, the membrane 32 can have a circular hole 34 in it, thereby allowing a round dowel to extend out of the dowel passage, while preventing wet concrete from creeping into the passage. In the event that a square dowel is used, the dowel can be forced through the membrane, puncturing the membrane. In a preferred embodiment, made of plastic, the membrane is approximately 0.5–1 milimeter thick.

To accommodate removal of the apparatus from the wooden form after the slab has hardened, spacers 36 can be included on the inner surface of the mounting flange. The spacers permit easy introduction of a crow bar or screw driver between the inner surface 16 of the mounting flange and the outer surface of the wooden form. In a preferred embodiment, the spacers surround the holes 20, and can also include a ring that surrounds the portion of the dowel guide that extends from the inner surface of the mounting flange, as shown in either of FIGS. 2 or 7.

The apparatus 10 can be manufactured from separate pieces that are combined together, or can be formed from a single unitary piece that is manufactured through molding or other such processes. In the preferred embodiment, the apparatus is made as a unitary piece of injection molded plastic. However, many other materials, including aluminum, nylon, rigid paper materials or the like can also be used.

Figure 7:
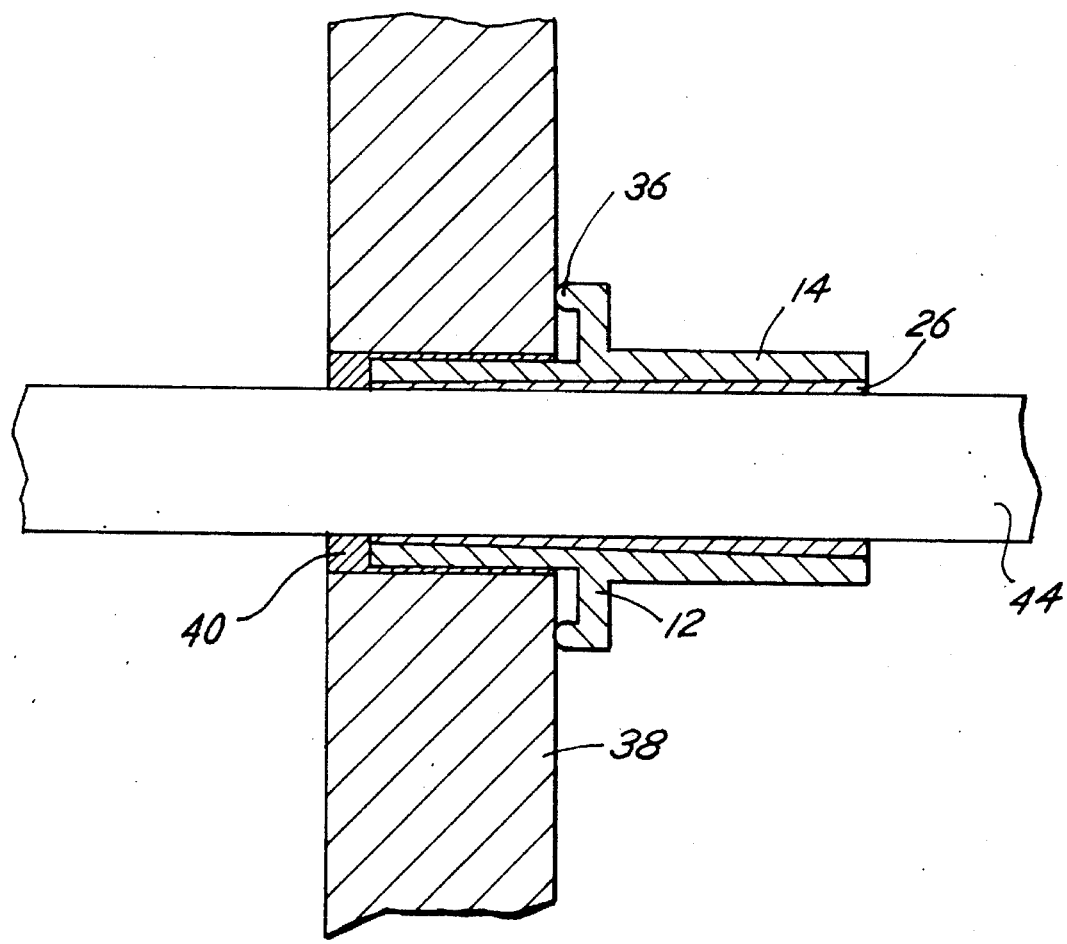
FIG. 7 of the drawing is a cross-sectional view showing the claimed apparatus as attached to a wooden form, with a dowel positioned in place.

Turning to FIG. 7, the, apparatus 10 is used by attaching it to a wooden form 38. Prior to attaching the apparatus to the form, a cylindrical hole 40 is drilled through the form. The inner diameter of the hole 40 should be only slightly larger than the outer diameter of the dowel guide 14 extending from the inner surface 16 of the mounting flange 12, allowing that portion of the dowel guide to fit closely into the hole 40. The portion of the dowel guide that extends into the hole 40 should not extend into the region where the slab is to be poured, as this may cause the device to become embedded in the slab. The apparatus 10 is mounted onto the side of the form opposite the side against which the slab is to be poured. The apparatus is held in place by nails 42 (not shown) that are driven though the holes 20 in the mounting flange and into the wooden form. The proper position of the apparatus can be determined by marking a guideline along the length of the form using a chalk line, and then aligning marks on the mounting flange 12 with that guide line.

Once the apparatus has been nailed into place on the form, and the form has been positioned in-place on the ground, a dowel 44 is slipped into the dowel passage 36 of the apparatus until approximately half the length of the dowel extends into the region where the concrete is to poured. The concrete is then poured, with the dowel 44 being held in place by the claimed apparatus 10. Alternatively, the dowel can be placed into the apparatus and into the slab after the concrete has been poured, but before the concrete has hardened.

After the slab has hardened, the nails 20 are removed from the apparatus, and the apparatus 10 is slipped away from the form and off of the dowel. It may be necessary to urge the apparatus off with prying. The form 38 can then be stripped away from the slab by slipping it sideways off of the dowels, which remain embedded in the concrete. The next section of slab can then be poured in the usual manner, so that the exposed portions of the dowels become embedded in the new section of the slab.

The claimed apparatus can also be used with non-wooden forms, including pre-cast concrete such as those disclosed in U.S. Pat. No. 4,884,384, as well as rails made of aluminum, fiberglass, and the like. The apparatus can also be used with forms having outer surfaces that are not flat. In that event, the inner surface of the mounting flange can be shaped in complementary fashion, so as to conform to the outer shape of the form.

While in the foregoing there have been described various preferred embodiments of the invention, it should be understood to those skilled in the art that various modifications and changes can be made without departing from the true spirit and scope of the invention as recited in the claims.

What is claimed is:

1. An apparatus for positioning a dowel within a concrete slab, formed by pouring concrete into a form, said apparatus comprising
   a) a substantially planar mounting flange having an inner surface and an outer surface; and
   b) a dowel guide that extends from the mounting flange at a desired angle, the dowel guide having an inner surface and an outer surface, the inner surface of the dowel guide defining a straight dowel passage having an opening at each end, whereby the apparatus can be secured to the form and a dowel can be introduced into the dowel passage with opposite ends of the dowel extending from opposite ends of the apparatus so that the one end of the dowel may be embedded into the concrete poured into the form and the apparatus can be removed from the other end of the dowel for reuse.

2. The apparatus of claim 1, wherein the dowel passage has a square cross-section.

3. The apparatus of claim 1, wherein the dowel passage has a circular cross-section.

4. The apparatus of claim 1, wherein the dowel guide is perpendicular to the plane of the mounting flange.

5. An apparatus for positioning a dowel within a concrete slab, said apparatus comprising
   a) a substantially planar mounting flange having an inner surface and an outer surface; and
   b) a dowel guide that extends from the mounting flange at a desired angle, the dowel guide having an inner surface and an outer surface, the inner surface of the dowel guide defining a straight dowel passage having an opening at each end, whereby a dowel can be introduced into the dowel passage with opposite ends of the dowel extending from opposite ends of the apparatus so that the one end of the dowel may be embedded into the concrete poured into the form and the apparatus can be removed from the other end of the dowel for reuse, and further comprising a deformable ridge that extends from the inner surface of the dowel guide along the length of the dowel passage.

6. The apparatus of claim 1, further comprising a rupturable (reputable) membrane that extends at least partially into the dowel passage from the inner surface of the dowel guide, whereby in use the dowel can be forced through the rupturable (reputable) membrane so as to extend from opposite ends of the apparatus.

7. The apparatus of claim 1, further comprising one or more spacers that extend outward from the inner surface of the mounting flange.

* * * * *